United States Patent [19]

Wihlidal

[11] Patent Number: 5,353,908
[45] Date of Patent: Oct. 11, 1994

[54] SUSPENDED CONVEYANCE APPARATUS

[75] Inventor: Daryl E. Wihlidal, Modesto, Calif.

[73] Assignee: Shibuya Kogyo Company, Ltd., Japan

[21] Appl. No.: 836,063

[22] Filed: Feb. 12, 1992

[51] Int. Cl.$^5$ .............................. B65G 47/00
[52] U.S. Cl. .................. 198/339.1; 198/678.1; 198/687.1; 198/803.15
[58] Field of Search ............ 198/678.1, 687.1, 841, 198/832, 834, 813, 803.01, 803.15, 339.1

[56] References Cited

U.S. PATENT DOCUMENTS

| | | | |
|---|---|---|---|
| 798,244 | 8/1905 | Wilmore | 198/339.1 |
| 924,360 | 6/1909 | Kirkegaard | |
| 1,095,228 | 5/1914 | Phinney et al. | 198/813 X |
| 1,652,597 | 12/1927 | Ayers | 198/131 |
| 1,668,427 | 5/1928 | Sephton | 198/179 |
| 1,740,233 | 12/1929 | Enz | 198/131 |
| 2,210,529 | 8/1940 | Dostal | 198/131 |
| 2,240,717 | 5/1941 | Read | 198/131 |
| 2,258,717 | 10/1941 | Read | 198/131 |
| 2,360,209 | 10/1944 | Dalrymple | 198/189 |
| 2,876,604 | 3/1959 | Engleson et al. | 198/131 |
| 2,942,719 | 6/1960 | Bofinger et al. | 198/33 |
| 3,108,682 | 10/1963 | Zipper | 198/162 |
| 3,591,027 | 7/1971 | East | 214/311 |
| 3,860,107 | 1/1975 | Cioni et al. | 198/131 |
| 3,901,180 | 8/1975 | Allen et al. | 118/2 |
| 3,975,260 | 8/1976 | Peyton et al. | 209/73 |
| 4,104,081 | 8/1978 | Totten | 134/23 |
| 4,114,347 | 9/1978 | Morris et al. | 53/300 |
| 4,172,514 | 10/1979 | Shantz et al. | 198/479 |
| 4,199,291 | 4/1980 | Winiasz et al. | 414/416 |
| 4,200,183 | 4/1980 | Riggs | 198/648 |
| 4,530,433 | 7/1985 | Cuccetto | 198/695 |
| 4,616,684 | 10/1986 | Tincati | 141/114 |
| 4,635,662 | 1/1987 | Totten | 134/68 |

Primary Examiner—Cheryl L. Gastineau
Attorney, Agent, or Firm—McCubbrey, Bartels & Ward

[57] ABSTRACT

The invention relates to an apparatus for conveying containers having an annular neck flange, in particular, a guided suspended conveyor chain having support elements each defining a "U" shaped recess having a pair of substantially parallel sides which are oriented transverse to the path of travel of the conveyor chain so that the "U" shaped recess is accessible from the side of the path of travel. The "U" shaped recess is sized to receive the container neck, is sized smaller than the annular neck projection of the container and is further sized so that the substantially parallel sides of the "U" shaped recess extend beyond the container neck of any container received therein so that the container may hang suspended in the "U" shaped recess. In addition, the conveyor chain is designed to be driven by a suitable drive stand to provide mechanical energy to associated container processing apparatus having sprockets adapted to engage the conveyor chain.

79 Claims, 11 Drawing Sheets

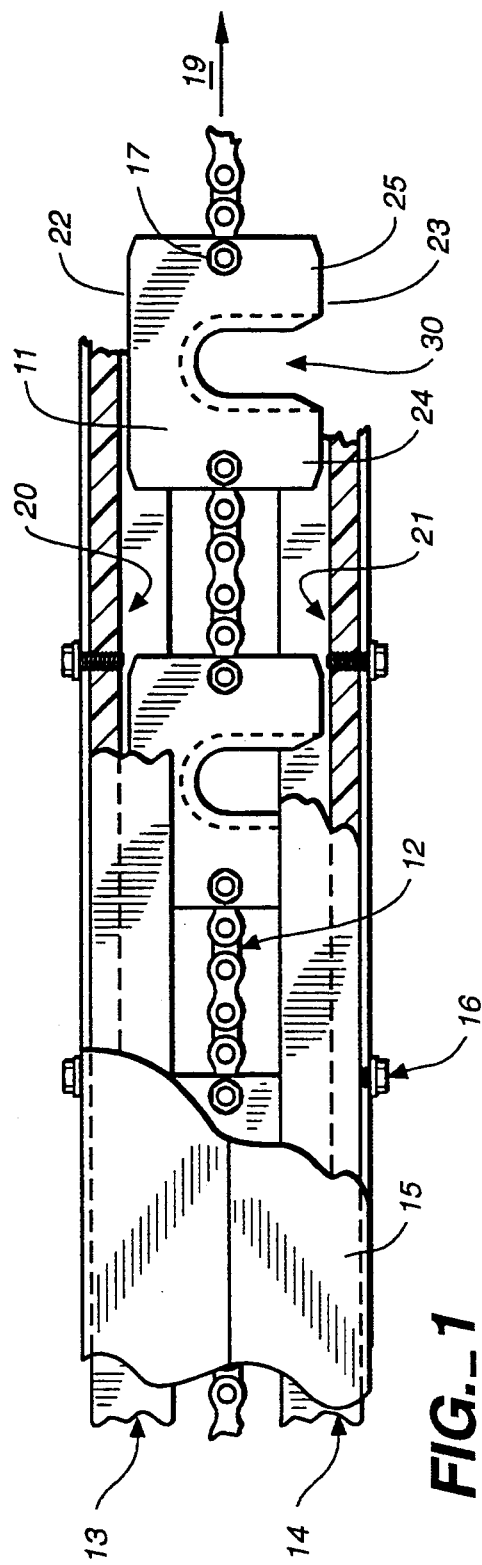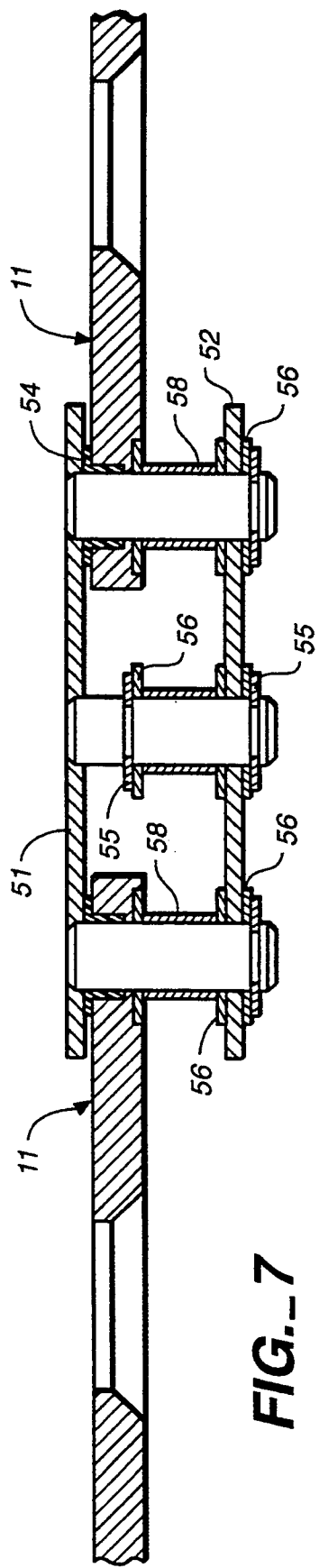

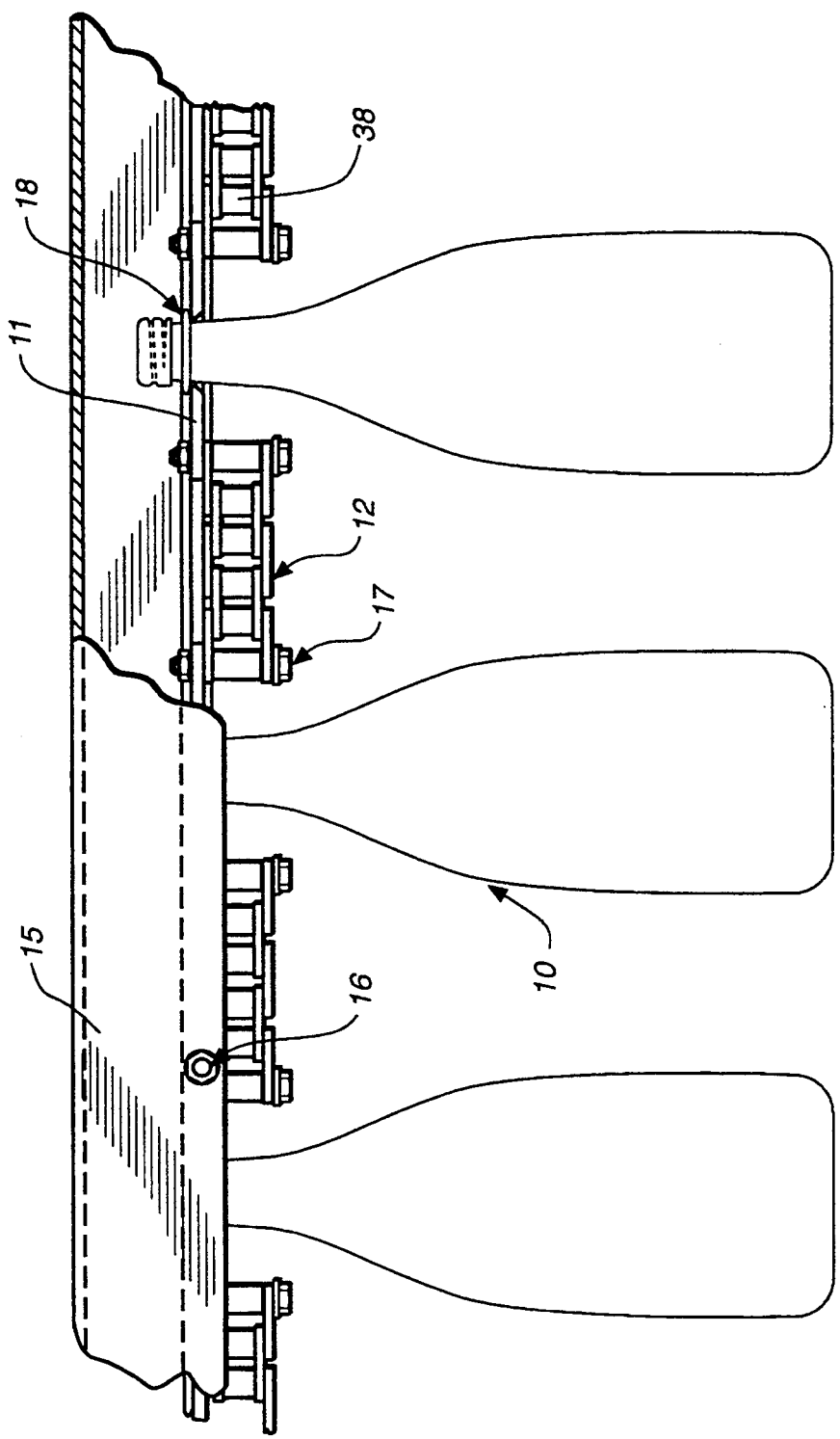
FIG._2

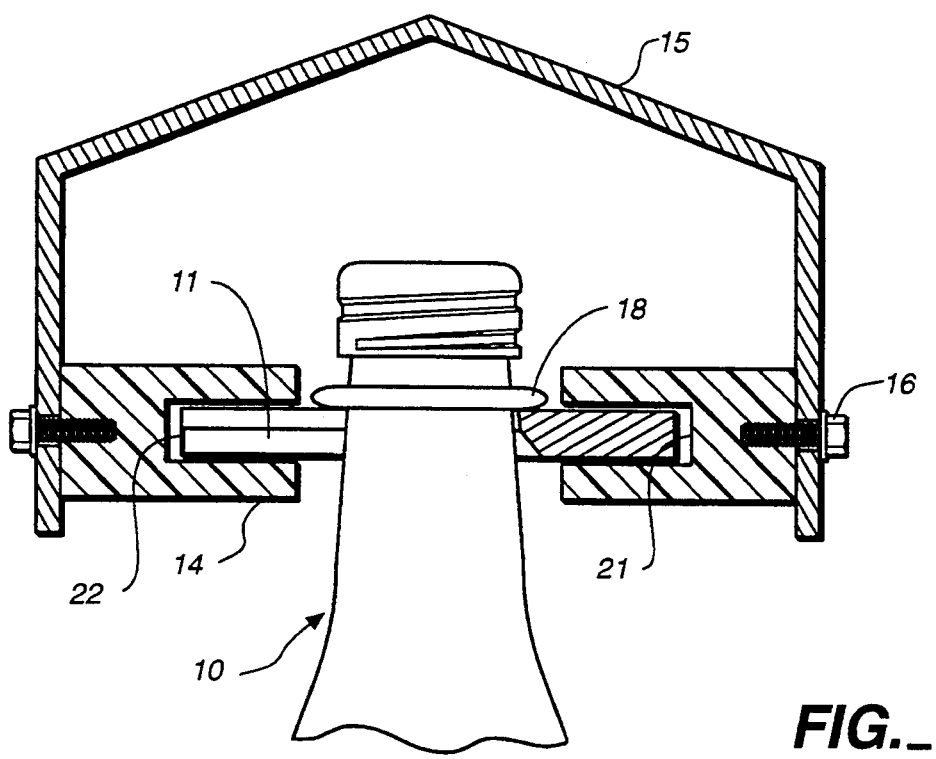
FIG._3
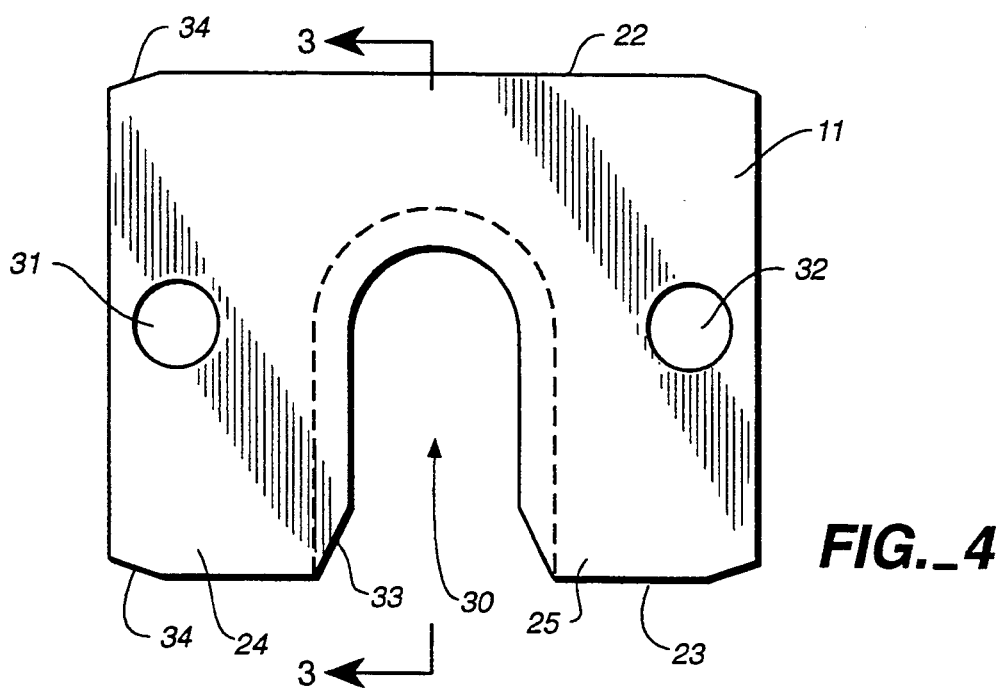
FIG._4
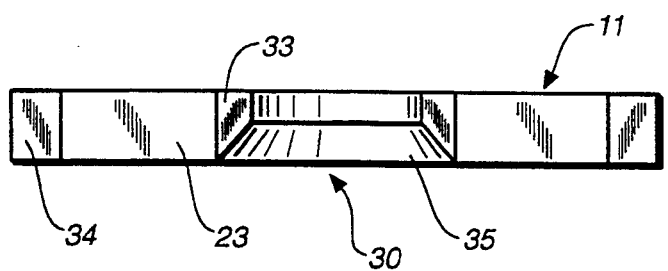
FIG._5

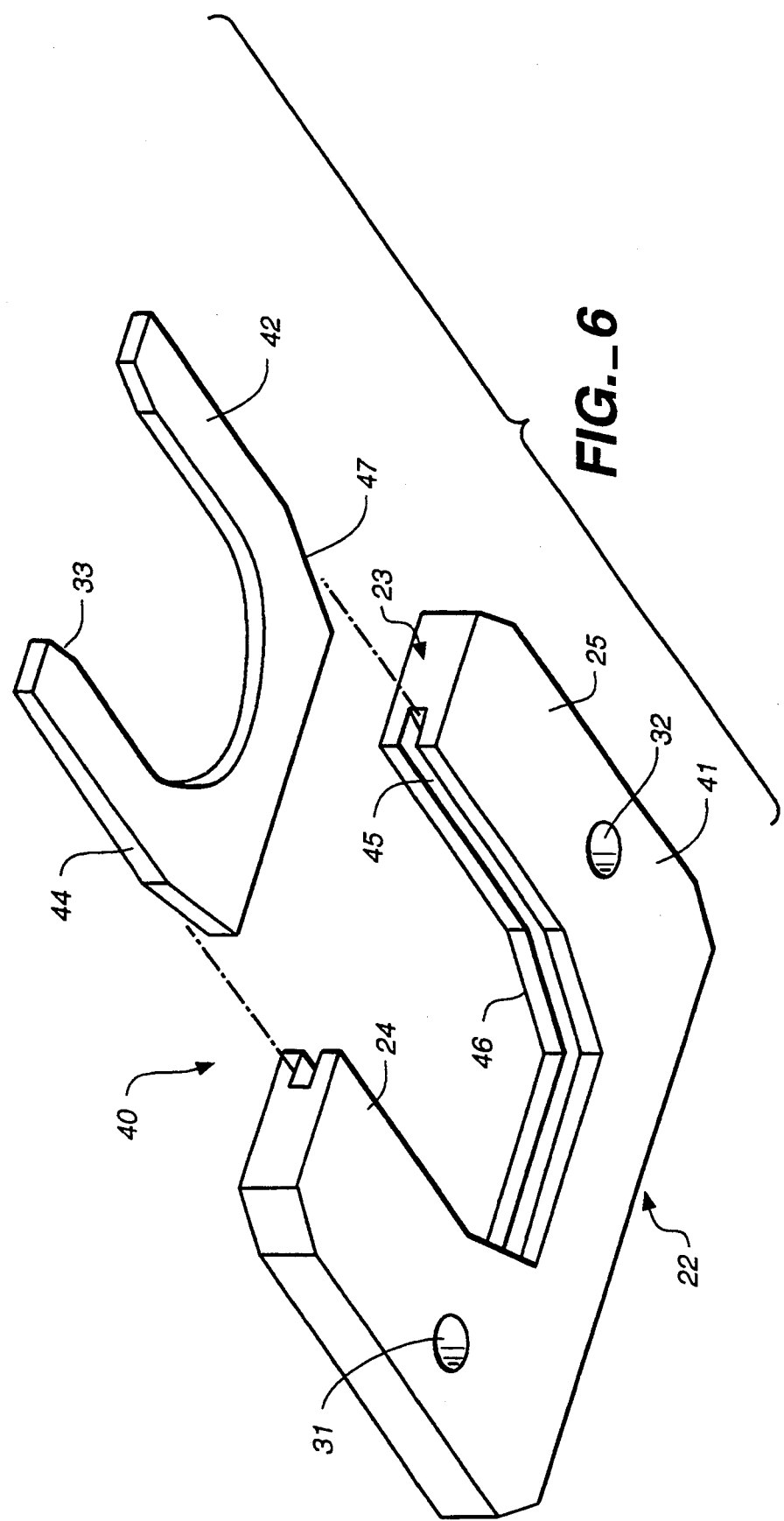
FIG._6

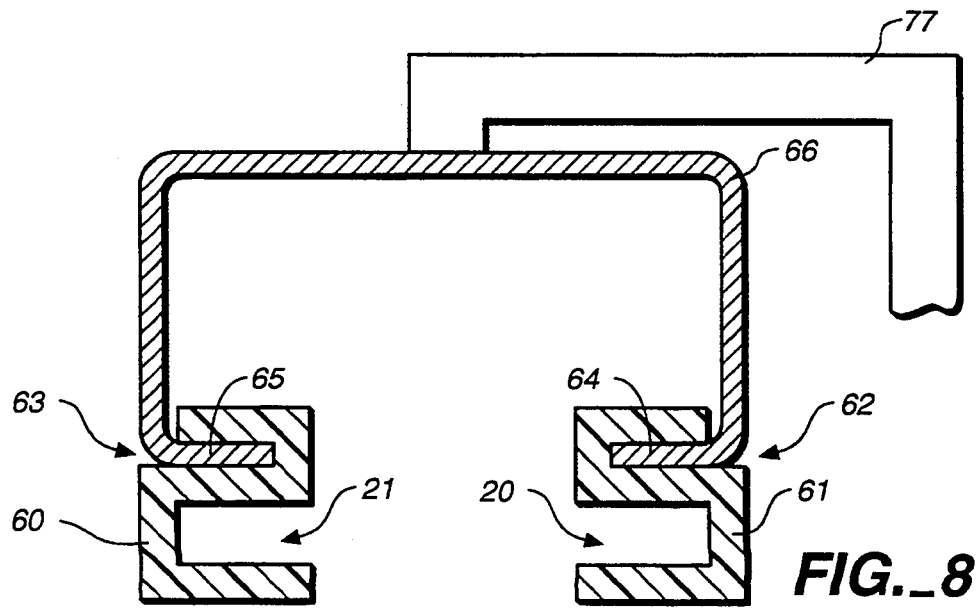
FIG._8
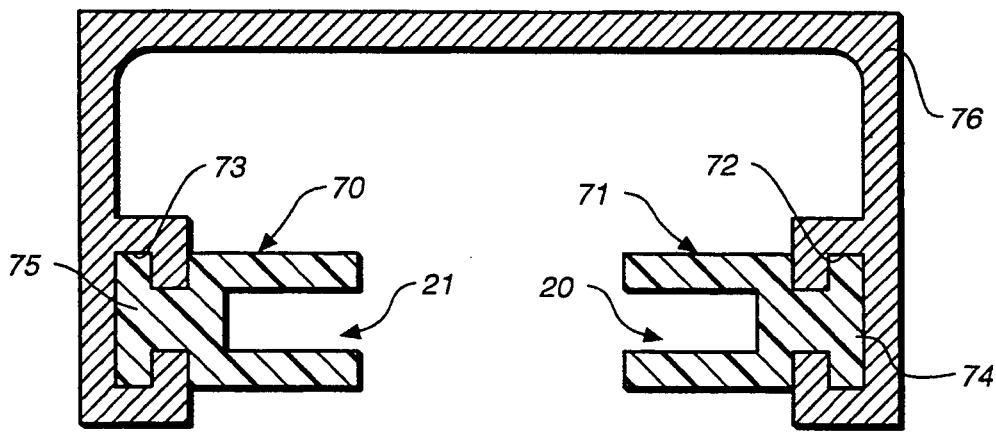
FIG._9
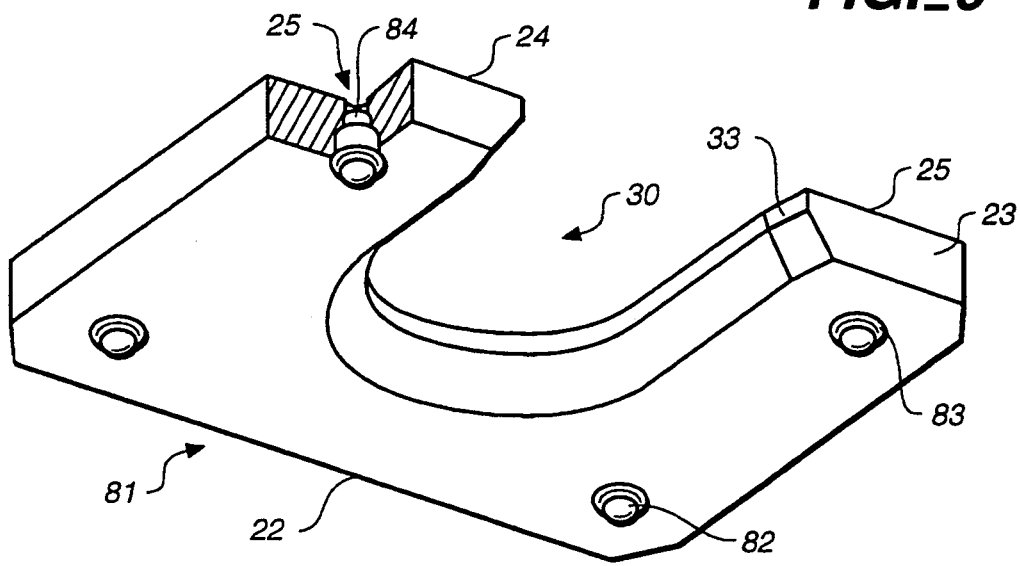
FIG._10

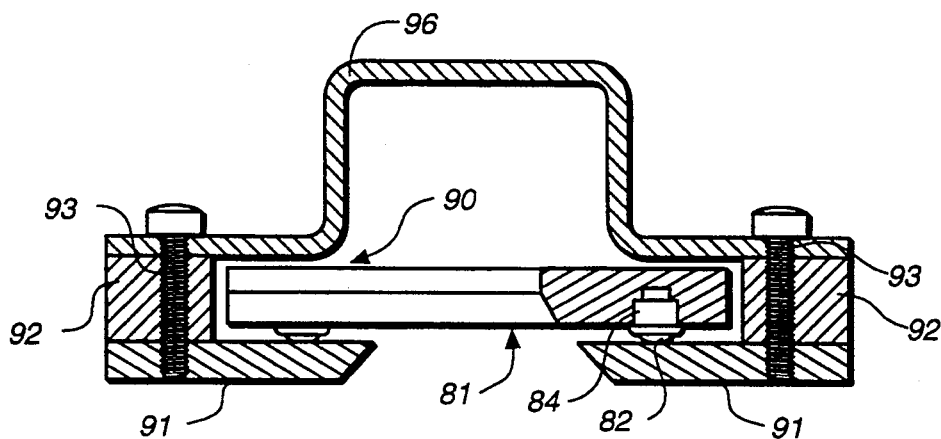
FIG._11
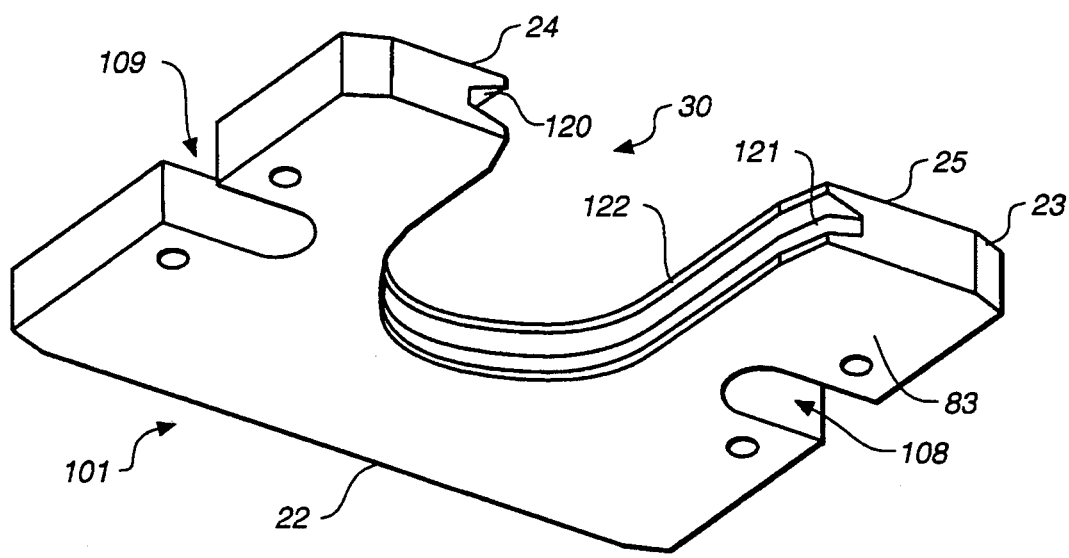
FIG._13

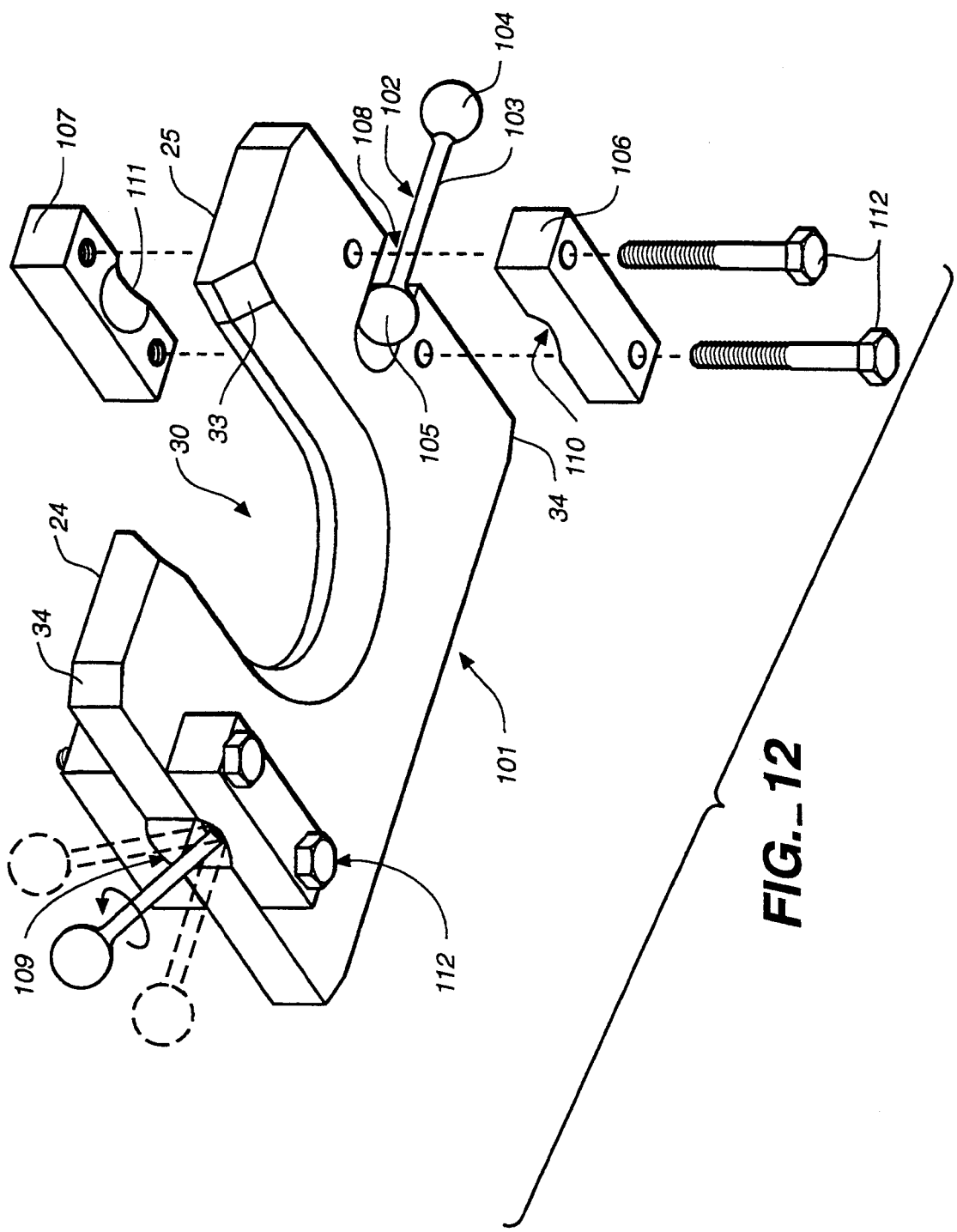
FIG._12

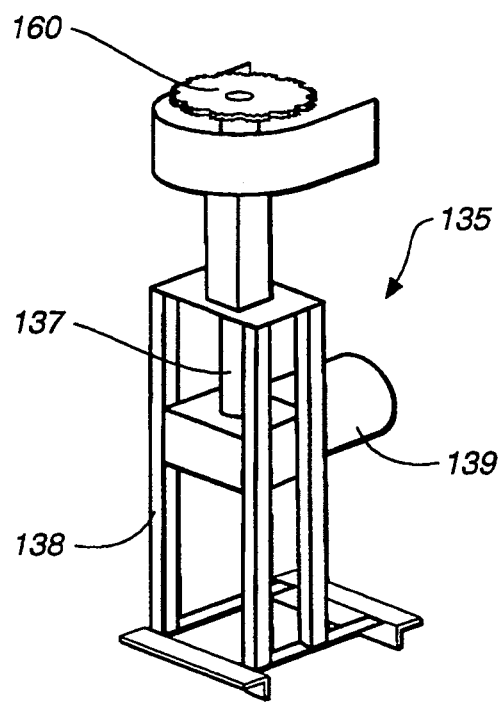
FIG._15
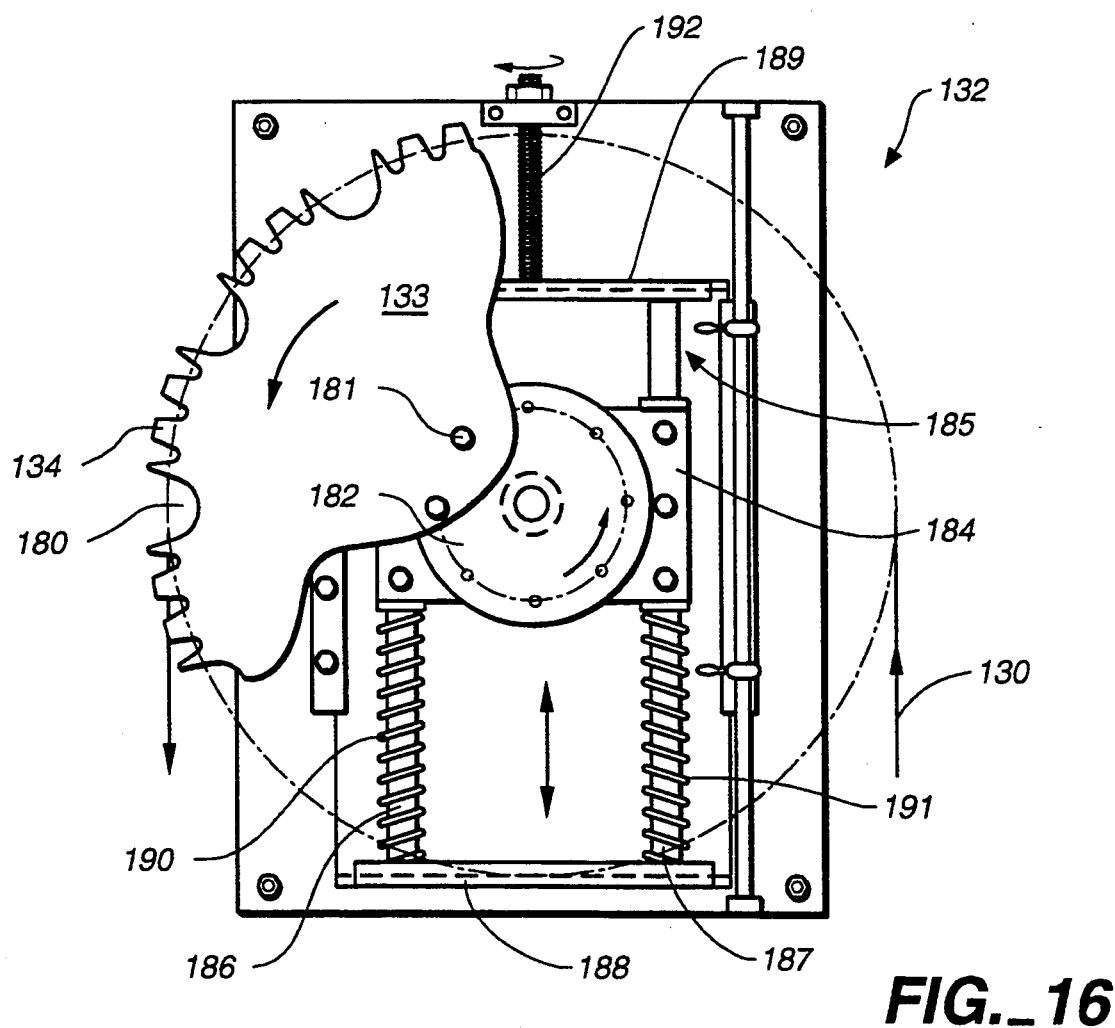
FIG._16

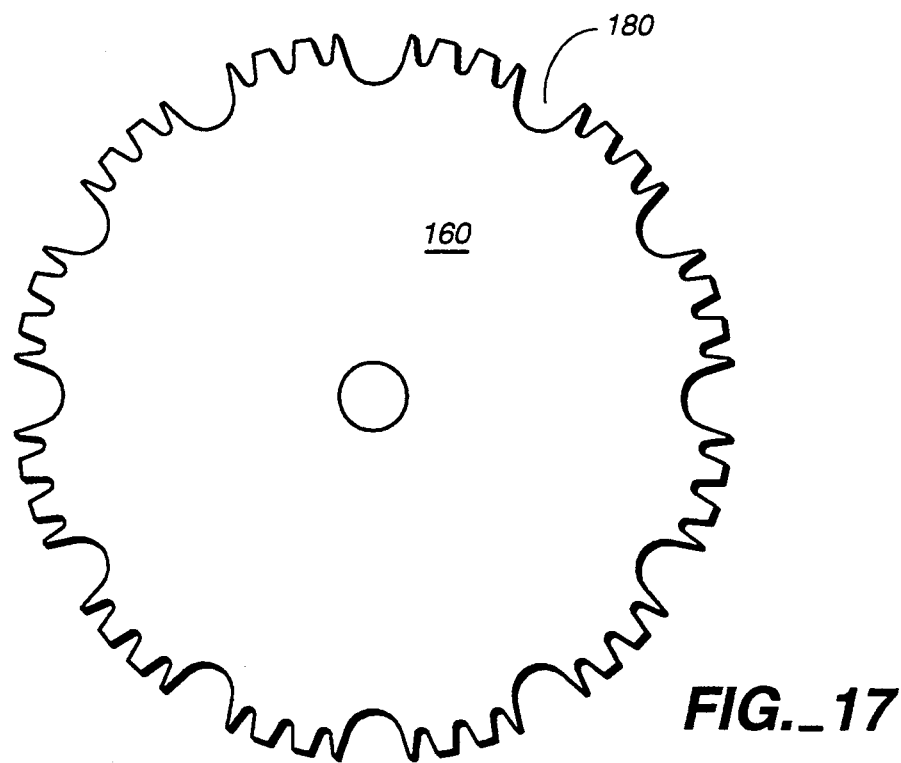
FIG._17
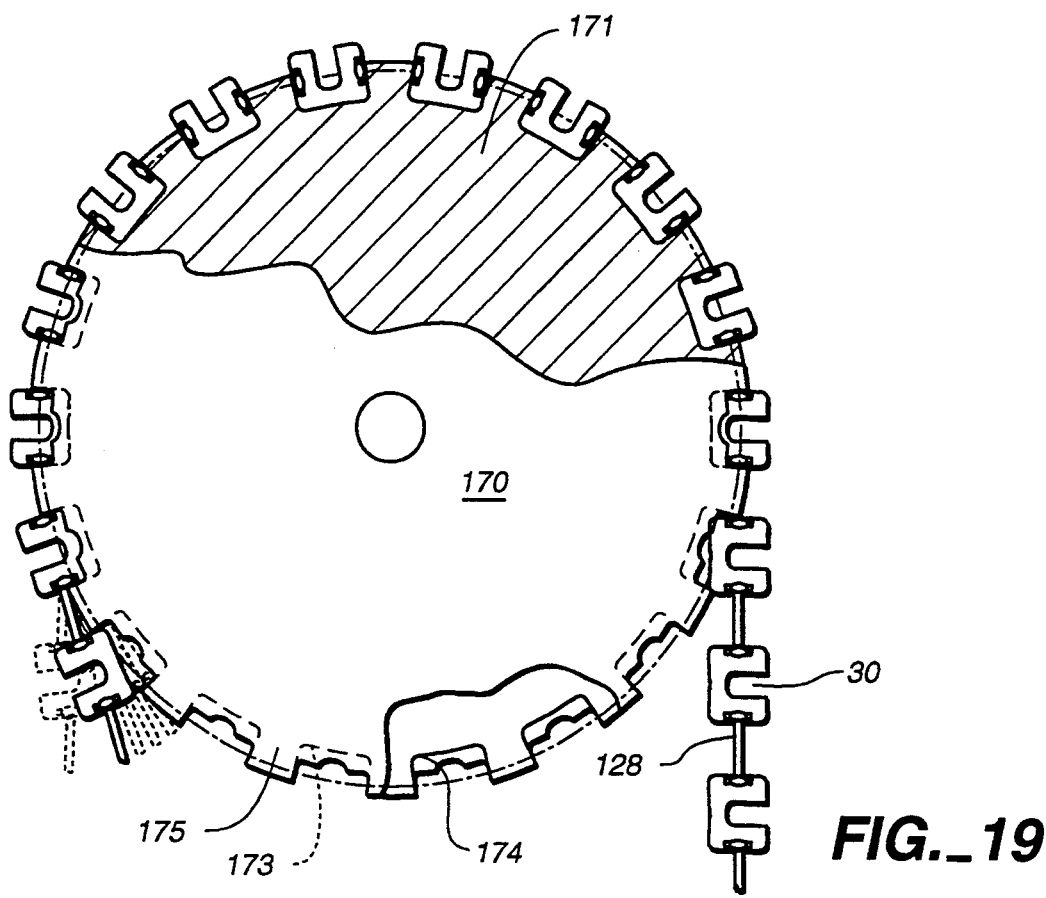
FIG._19

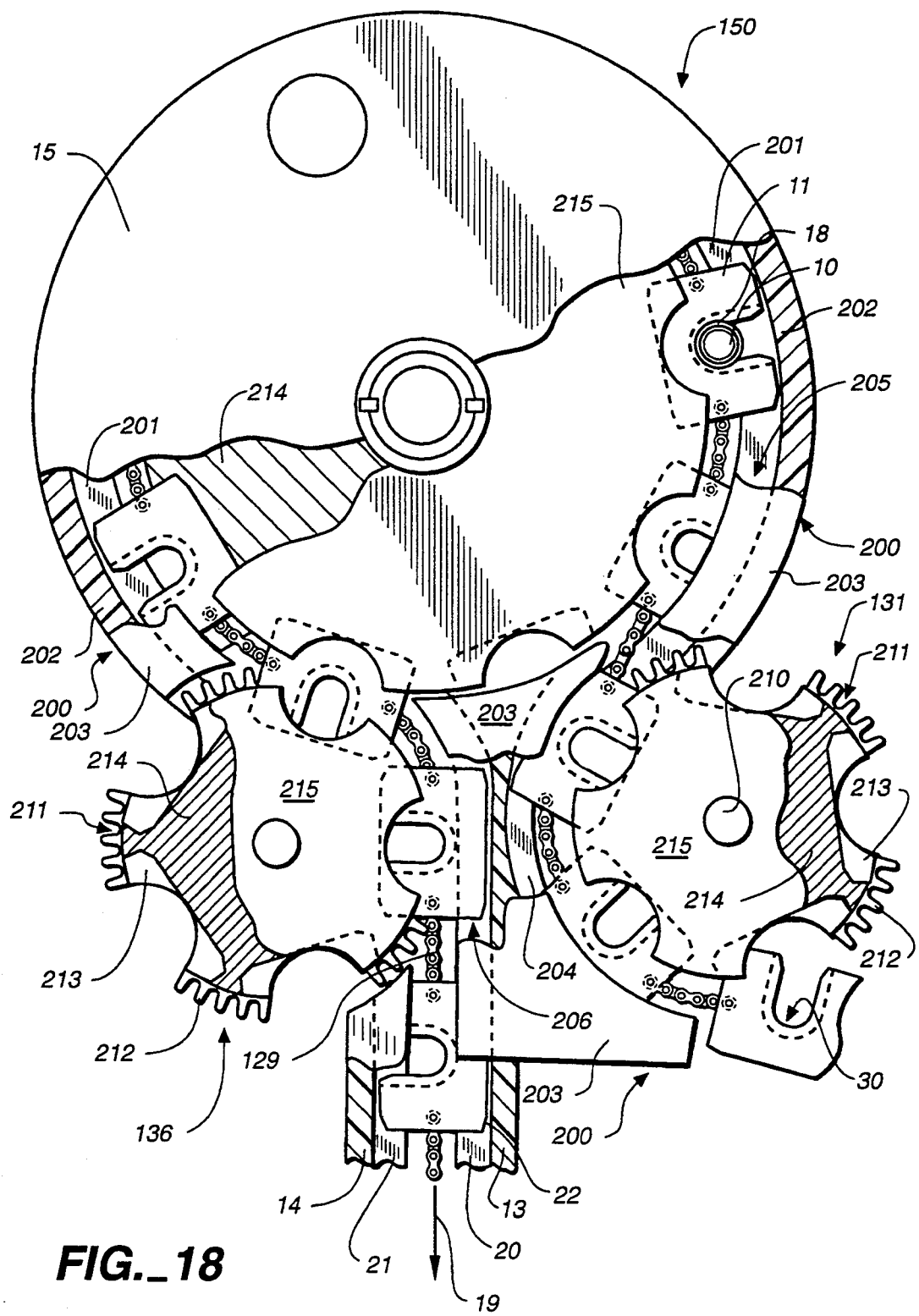
FIG._18

SUSPENDED CONVEYANCE APPARATUS

FIELD

The present invention relates generally to conveyors for moving a plurality of containers to and/or from one or more processing stations or the like. More particularly, the present invention relates to conveyor apparatus having a plurality of elements, each defining a substantially "U" shaped slot wherein a bottle or other container is suspended at the neck portion by an annular flange on the container.

BACKGROUND

Current container processing plants, such as bottling processing plants, are often required to handle a wide variety of container products. In order to accommodate the many and varied products and container shapes and sizes, current plants require fast and convenient processing line changeover. Often, expensive servo-driven mechanisms along with numerous container control feedscrews and starwheels are utilized to complete this function, resulting in both expensive systems and extensive labor requirements. Container processing equipment and machinery such as cappers, fillers, and labellers currently must raise and lower to accommodate container heights each time a different size container is used because of the standard and universal approach of transporting containers by their base and transferring the containers from the conveyor to the processing equipment. Additionally, due to the standard convention of using conveyors which transfer containers by their base, it is often necessary to utilize multiple conveyors in order to bring the containers through the entire processing line so that each processing station may be visited. The resulting configuration is inefficient, expensive, and quite large.

In certain types of known bottle conveyors, pincers or pivotal levers are used in conjunction with half collars so that bottles are gripped below an annular neck flange formed on the bottle. Each half collar and pincer set combination are positioned on individual plates so that one half of the circumference of the bottle neck is surrounded by the half collar with the pivotal levers closing around the remainder of the circumference to hold the bottle against the half collar. The individual plates are rigidly connected to form a conveyor which is capable of rectilinear travel. Each plate includes a set of wheels which follow a set of linear rails. Further, the pivotal levers are configured so that they open to release their grip on the bottle when a second set of wheels, which are attached to the non-engaging end of the levers, are squeezed together. An example of such a device is shown in U.S. Pat. No. 4,530,433 to Cucchetto et al. This type of conveyor, however, has proven to be unsatisfactory in conveying bottles or other containers having annular neck flanges for a number of reasons. First, although the half collar and lever pair combination is able to support bottles at the neck, the configuration requires that the bottles be loaded into the device from the leading edge of each plate, as determined by the direction of travel of the conveyor. This requires that individual bottles be brought to a position between the individual plates so that the bottles can be inserted into the semi-circular opening provided by the half collar. This type of loading is extremely impractical and inefficient, often requiring the conveyor itself to be stopped as each bottle is loaded into the individual half collars. Second, this type of conveyor is not capable of curvilinear travel, which vastly reduces the utility of the conveyor. Third, because each bottle is gripped by the pincer arrangement, the adaptability of the conveyor to various tasks is limited. Often, provision must be made to release the bottles so gripped. Additionally, numerous other pitfalls are associated with this type of conveyor, including, but not limited to, its inability to perform inverted operations.

SUMMARY OF THE INVENTION

Broadly, it is an object of the present invention to provide a conveyance apparatus suitable to convey containers through associated container processing apparatus while the containers are held suspended by their annular neck flange.

Another object of the present invention is to provide a conveyance apparatus suitable to convey containers through a series of associated processing apparatus without the need to transfer the containers to and from the conveyance apparatus.

Another object of the present invention is to provide a conveyance apparatus suitable to accommodate a wide variety of container shapes and sizes without the need for processing line changeover.

Another object of the present invention is to provide a conveyance apparatus to which containers may be inserted into and removed therefrom in a manner which will not detract from the operation of the conveyor or the simplicity of its design.

Another object of the present invention is to provide a conveyance apparatus capable of inverted and curvilinear conveyance of containers.

A further object of the present invention is to provide a driven endless container conveyance apparatus, comprised of links, wherein the conveyance apparatus is suitable for supplying containers to associated container processing apparatus which derive operating power from the endless link type conveyance apparatus.

A still further object of the present invention is to provide a container conveyance apparatus which eliminates the need for starwheels, feedscrews and other devices that control the timing at which containers are supplied to various associated container processing apparatus.

Very generally, the container conveyance apparatus of the present invention is for use in the container processing industry for conveying containers of various shapes and sizes through various container processing apparatus. Very particularly, the present invention is ideally suited for use in the bottling industry to convey bottles or similar containers through a series of container processing apparatus, such as labelers, cappers, and fillers.

The container conveyance apparatus of the present invention comprises a plurality of support elements, means for flexibly linking the support elements to form an endless conveyor chain and guide means engaging the support elements and defining a path of travel for the endless conveyor chain. The support elements each define a "U" shaped recess having a pair of substantially parallel sides which are oriented transverse to the path of travel of the endless conveyor chain so that the "U" shaped recess is accessible from the side of the path of travel. The "U" shaped recess is sized to receive the container neck and is sized smaller than the annular neck projection of the container. The "U" shaped recess is further sized so that the substantially parallel sides of the "U" shaped recess extend beyond the container neck of any container received therein so that the container may hang suspended in the "U" shaped recess.

The container conveyance apparatus of the present invention may also comprise means for providing mechanical energy to the conveyor. The mechanical energy may thereafter be available for consumption by associated container processing machinery having means for engaging the conveyor.

BRIEF DESCRIPTION OF THE DRAWINGS

Further features and advantages will become apparent from the following and more particular description of the preferred embodiment of the invention, as illustrated in the accompanying drawings, in which like reference characters generally refer to the same parts or elements throughout the views and in which:

FIG. 1 shows a plan view of a conveyance apparatus constructed in accordance with the present invention;

FIG. 2 shows a cross-sectional view of a conveyance apparatus constructed in accordance with the present invention;

FIG. 3 shows an elevational view of a conveyance apparatus constructed in accordance with the present invention;

FIG. 4 shows a plan view of a plate member constructed in accordance with the present invention;

FIG. 5 shows a cross-sectional view of a plate member constructed in accordance with the present invention;

FIG. 6 shows a plan view of a variant of the embodiment of the plate member of the present invention;

FIG. 7 shows a cross-sectional view of a variant of the embodiment of the linking means of the present invention;

FIG. 8 shows a cross-sectional view of a variant of the embodiment of the guide means, guide support means and the interface therebetween;

FIG. 9 shows a cross-sectional view of an additional variant of the embodiment of the guide means, guide support means and the interface therebetween;

FIG. 10 shows a bottom perspective view of an alternate of the embodiment of the plate member of the present invention;

FIG. 11 shows a cross-sectional view of the guide means, guide support means, and the interface therebetween for use with the alternate embodiment of the plate member shown in FIG. 10;

FIG. 12 shows a perspective view of an alternate of the embodiment of the plate member of the present invention, including the linking means to be used with the same;

FIG. 13 shows a perspective view of the plate member depicted in FIG. 12;

FIG. 15 shows a perspective view of the drive means of the present invention;

FIG. 16 shows a plan view of the take-up unit of the present invention;

FIG. 17 shows a plan view of the sprocket for use with the embodiment of the linking means shown in FIG. 7;

FIG. 18 shows a plan view of an endless conveyor chain constructed in accordance with the present invention in engagement with the idler mechanism, associated container processing machine and pulse sensor illustrated in FIG. 14; and FIG. 19 shows a plan view of the sprocket means for use with the embodiment shown in FIG. 12.

DETAILED DESCRIPTION OF THE INVENTION

Figure 14:
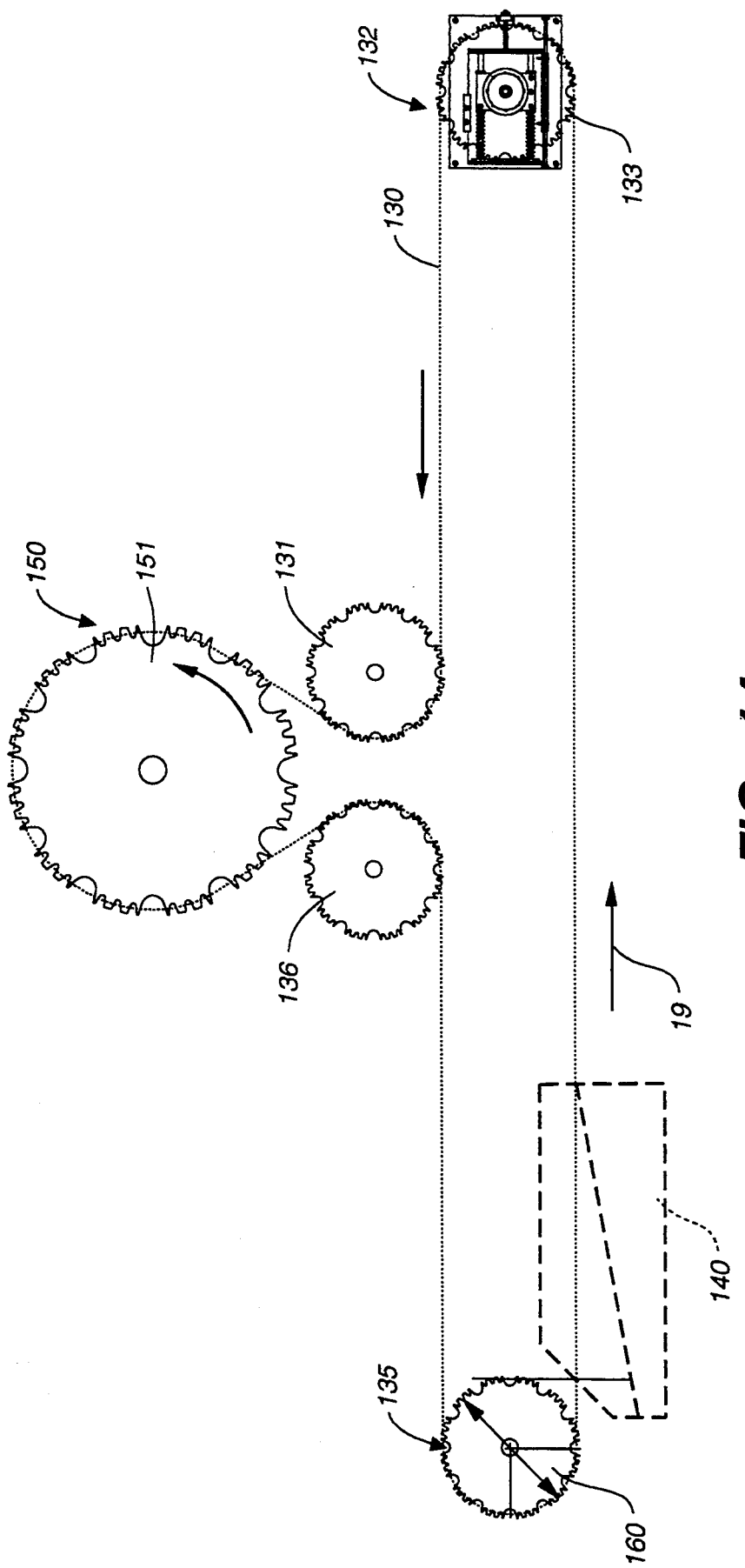
FIG. 14 is a schematic diagram illustrating the conveyance apparatus for driving associated container processing machinery constructed in accordance with the present invention.

Referring now to FIGS. 1, 2 and 3, a preferred embodiment of a conveyance apparatus for transporting containers is illustrated.

The conveyance apparatus for conveying containers characterized by having an annular flange 18 about their necks, such as bottles 10, comprises a plurality of suitable support elements, such as like carrier plate members ("carriers") 11, which are flexibly linked by suitable linking means, such as roller chain link sections 12 or other flexible tension members, to form an endless conveyor chain, and suitable guide means for defining the path of travel 19 of the endless conveyor chain, such as elongated wear strip members 13 and 14. Roller chain link sections 12 are rotatably connected between carriers 11 by suitable means, such as retained pins 17 seated in plastic flanged bearing cylinders (not shown). Flanged bearing cylinders are fitted into holes 31 and 32 of carriers 11 and accept pins 17 therethrough. It has been found desirable to use IGLIDE 300 ™ self-lubricating thermoplastic bearings distributed by Igus, Inc. of East Providence R.I. These thermoplastic bearings tolerate oscillatory motion and require minimal (if any) periodic lubrication. Brass, oil-impregnated bronze, needle (roller), and ball bearings may also be used within the spirit and scope of the present invention.

Wear strip members 13 and 14 are spaced uniformly apart to establish a predetermined path for the conveyor chain and to provide the support for both the conveyor chain and the containers conveyed by the apparatus. In order to provide support, wear strip members 13 and 14 have channels 20 and 21 adapted to receive carriers 11 at edges 22 and 23, respectively. Edges 22 and 23 of carriers 11 slide within channels 20 and 21 as the conveyor chain travels through path 19 defined by wear strip members 13 and 14. Carriers 11 include substantially parallel sides or prongs 24 and 25. Prongs 24 and 25 are sized to extend beyond the circumference of the neck of the containers 10 as they hang suspended in slots 30 so that edge 23 may be received in channel 21 without binding containers 10 in slots 30 against wear strip member 14.

Suitable transport means for allowing the conveyor chain to travel through the guide means include wear strip members 13 and 14 being fabricated out of a self-lubricating plastic material, such as NOLU-S ™, an ultra high molecular weight polyethylene alloyed with a fluid lubricating system ("alloyed polyethylene") available from Nolu Plastics, Inc. Nolu Plastics, Inc. claims that NOLU-S ™ is covered by the claims of U.S. Pat. No. 4,357,249, to Mellor.

Wear strip members 13 and 14 are spaced apart and supported by suitable support means, which may also provide container opening protection, such as elongated roof member 15. The support means may be mounted overhead (as shown) or may alternatively be mounted under wear strip members 13 and 14. Roof member 15 is attached by suitable mechanical bonding means, such as machine screws 16, to wear strip members 13 and 14 or may be an integral part of the guide means by using an extrusion as will be discussed hereinbelow in reference to FIGS. 8 and 9. Roof member 15 is suspended by suitable hangers or the like (not shown).

Refer now to FIGS. 4 and 5. Bottles 10 or other containers are fed by hand or machine into "U" shaped slots 30 of carriers 11. The carriers 11 are fabricated out of a suitable material, such as stainless steel. By using wear strip members 13 and 14 manufactured out of alloyed polyethylene, as described hereinabove, and relatively smooth stainless steel carriers 11, the coefficient of friction is reduced to a range between 0.05 and 0.12. Carriers 11 have holes 31 and 32 drilled therein to accept retained pins 17 seated in flanged bearings as described hereinabove. Slots 30 are oriented transverse to the direction of travel of the conveyor so that bottles or other containers may be inserted into the slots 30 from the side as the conveyor travels along path 19 prescribed by wear strip members 13 and 14. In order to insert containers 10 into slots 30, a gap (not shown) is integrated into wear strip member 14. The gap is of a size suitable to allow insertion of containers 10 into slots 30 as the conveyor travels along its defined path 19 and further sized so as not to allow carriers 11 to "fall out" of wear strip member 14. Accordingly, the size of the gap will depend on other parameters such as conveyor speed, container insertion speed, container 10 neck size, etc. Slots 30 include funnel portions 33 to facilitate container insertion into slots 30. Similarly, carriers 11 have angled or rounded corners 34 to facilitate ease of transport around turns presented by the guide means constructed in accordance with the present invention. Those skilled in the art will recognize that by orienting the "U" shaped slots 30 of carriers 11 transverse to the direction of travel along path 19 containers 10 may be easily fed into or removed from slots 30 without interrupting the travel of the conveyor.

Slots 30 are sized to accept the neck of a given container or bottle 10 therein and are also sized smaller than the annular neck projection 18 of said containers or bottles 10 so that said containers or bottles 10 may be inserted into slots 30 and will thereafter hang suspended by the annular neck projection 18. As an example, typical neck diameters of common soda bottles range from 25 mm to 27 mm while typical annular neck flange diameters of the same bottles range from 30 mm to 38 mm. In order to accommodate bottles of this size, slots 30 must have an inner diameter of at least 25 mm, but not larger than 30 mm. It has been found desirable to size slots 30 so that said slots have an inner diameter of 27.4 mm. In order to accommodate containers having neck diameters which approach the diameter of slots 30 and/or containers 10 having profiles which taper slightly outward immediately below flange 18, slots 30 are tapered outward at taper 35. Wear strip member 14 in the illustrated embodiment ensures that containers 10 are not permitted to slide out of slots 30 during conveyance thereof.

Refer now to FIG. 6. A variant embodiment of the carriers of the present invention are shown as interchangeable carriers 40. Carriers 40 comprise outer plate members 41 defining a general "C" shaped recess and detachable inner plate members 42. Outer plate members 41 are fitted with rectangular channel 45 sized to receive the outer edge 44 of detachable inner plate members 42. By machining the height of edge 44 within a close tolerance of the height of channel 45, detachable inner plate members 42 are held in place due to the force of friction, yet are still easily removed. It should be understood that the force of friction alone is sufficient in most applications to hold plates 42 in place because plates 42 are further confined by wear strip member 14. However, other retaining means such as spring loaded tabs/slots, etc., well known to those skilled in the art, may be used within the spirit and scope of the present invention.

As discussed hereinabove, slots 30 of plate members 11 have an inner diameter of 25 mm to 30 mm to accommodate common bottles with typical neck diameters. In order to accommodate containers having a wider variety of neck and flange sizes, inner plate members 42 may be detached, by hand or by suitable machine, at a gap (not shown) in wear strip member 14 sized large enough to allow passage therethrough of plate members 42, and interchanged with like detachable plate members (not shown) wherein the inner slot diameter of the interchanged plate members are appropriately matched to the containers to be processed. Obtuse 3-sided corners 46 of channel 45 and cut-aways 47 of plates 42 are incorporated to relieve the stress which normally accompanies a sharp corner. However, rounded corners (not shown) accomplish the same result and are within the spirit and scope of the present invention.

Refer now again to FIGS. 1 and 3. As described hereinabove, roller chain link sections 12 link carriers 11 to form an endless conveyor chain. Roller chain link sections 12 are mounted to carriers 11 at holes 31 and 32. Link sections 12 are positioned below the plane formed by carriers 11 to ensure that the surface of carrier plates 11 are free from obstruction and are adapted to interlock or grip drive sprockets and/or equipment turrets at hardened bushings 38 below the plane formed by carriers 11 as will be described in detail below. It should be noted that by placing sections 12 below (or above) the plane formed by carriers 11 two additional hardened rollers 38 are available to interlock with an appropriate sprocket and/or turret. However, sections 12 may be placed in the plane formed by carriers 11 within the spirit and scope of the present invention.

Refer now to FIG. 7. The linking means of the present invention provides a pivotal means of linking carriers 11 to one another to form an endless conveyor chain. The linking means of the present invention also acts as a power transmission means for providing mechanical energy to associated container processing apparatus. Depending upon the particular application, it has been found that roller chain link sections 12 may be undesirable due to inadequate strength properties of roller chain link sections 12. FIG. 7 shows a variant 3-pin rigid link section 50 which is designed to link carriers 11 to form an endless conveyor chain. Rigid link section 50 comprises 3-pin top link member 51 of welded construction having three bushing cylinders 53, 3-pin bottom link plate 52, flanged cylindrical bearings 54, retaining rings 55, washers 56, and hardened rollers 58. Flanged cylindrical bearings 54 are seated in slots 31 and 32 of carriers 11 and are preferably of the same self-lubricating thermoplastic construction as the bearings described above in connection with FIGS. 1 and 3.

Bushing cylinders 53 pass through bearings 54, through carrier 11 at holes 31 and 32, washers 56, and through hardened rollers 58 which may be engaged by a suitable sprocket means. The cylinders further pass through bottom link plate 52, washers 56 and are held in place by retaining rings 55 below plate 52. The center bushing cylinder 53 does not pass through bearings 54 or through carrier 11. Alternatively, a hardened roller 58 is secured in place between washers 56 by a retaining ring 55 where it may be engaged in a manner similar to the other two hardened rollers of rigid link 50. The 3-pin rigid links 50 have been found to be considerably stronger than the roller link sections 12 described hereinabove. Those skilled in the art will recognize that similar configurations of rigid link 50 may be used to link carriers 11 to form an endless conveyor chain. Accordingly, in reference to FIG. 7, in certain applications, it may be advantageous to eliminate the center bushing cylinder 53 of rigid link 50 to form a 2-pin rigid link.

Referring now again to FIGS. 1, 2 and 3. Means suitable to guide carriers 11, such as wear strip members 13 and 14, are shown suspended and mechanically bonded to suitable support means, such as elongated roof member 15. It has been found in certain applications, particularly where wear strip members 13 and 14 are formed out of the alloyed polyethylene material described hereinabove, that wear strip members 13 and 14 expand and contract due to frictional heating and cooling at different rates than roof member 15 (which is not frictionally heated and which is generally constructed out of an inexpensive low grade steel). Those skilled in the art will recognize that the aforementioned expansion and contraction will be inhibited due to the coupling means depicted in FIGS. 1, 2 and 3, namely, machine screws 16. In many applications this will cause wear strip members 13 and 14 to take on an undesirable wave-like configuration.

Refer now to FIGS. 8 and 9. FIGS. 8 and 9 each show a variant embodiment of the guide means, the guide support means, and the means for coupling the guide means to the guide support means. In reference to FIG. 8, suitable guide means, such as alloyed polyethylene wear strip members 60 and 61 are shown. Wear strip members 60 and 61 are extruded to an "S" shape to include channels 20 and 21 as described hereinabove and to include extruded coupling means comprised of channels 62 and 63 which are adapted to receive and couple portions 64 and 65 of suitable support means, such as elongated roof member 66, to wear strip members 60 and 61.

The "S" configuration of wear strip members 60 and 61 does not allow wear strip members 60 and 61 to separate as carriers 11 slide in channels 20 and 21. However, wear strip members 60 and 61 may slide axially relative to elongated roof member 66 at channels 62 and 63. Roof member 66 is anchored by suitable means, such as cantilever support brackets 77 extending to the floor of the processing facility at points along its length. The box shape of roof member 66 functions to support the weight of the floating roof member 66 and the conveyor chain itself. Those skilled in the art will recognize that wear strip members 60 and 61 are vertically supported by portions 64 and 65 of roof member 66. Further, members 60 and 61 are restrained laterally from separating by channels 62 and 63 and from moving toward each other by the presence of carrier plates (not shown) travelling in channels 20 and 21. Those skilled in the art will further recognize that this configuration allows for axial expansion of wear strip members 60 and 61 without buckling or inducing wave-like patterns onto the wear strip members themselves. It has been found advantageous, in certain applications, to cut the wear strip members into sections or lengths (ten foot lengths by way of example). The sections are then mechanically held at the first or leading ends of each section, at a single point by suitable means, such as a single recessed bolt or rivet to roof member 66 (at portion 64 or 65). The second or trailing end of each section is then left free to allow for expansion and contraction along the section's length. Subsequent sections are similarly mounted, arranged so that each free end is proximate to the subsequent section's held end. A small gap should be left between the sections to allow for axial thermal expansion of each section. If the complimentary gaps as to members 60 and 61 are staggered, a minimum of disturbance is created as the carrier travels from one section to another over any given gap. Section length can be altered to suit the particular application. Lateral expansion is easily accommodated by allowing a small degree of play as the carrier plates slide in channels 20 and 21.

Refer now to FIG. 9. FIG. 9 shows an additional variant similar to FIG. 8. Wear strip members 70 and 71 are extruded to include T-tabs 74 and 75. The T configuration of tabs 74 and 75 allow axial sliding movement in channels 72 and 73 of roof member 76, respectively. Those skilled in the art will recognize that the configuration provides additional lateral stability and overall strength over the embodiment shown in FIG. 8 while somewhat increasing cost. Therefore, the conveyor application designer should balance strength and cost considerations when attempting to determine the appropriate guide, guide support and coupling means of the present invention to suit his or her particular application.

Refer now to FIG. 10. An alternate embodiment of the plate member of the present invention is shown as bearing plate member 81. As discussed hereinabove, alloyed polyethylene wear strip members 13 and 14 allow carriers 11 to slide in channels 20 and 21 with a coefficient of friction approaching 0.05. This allows the carriers to hydroplane or skim along the surface without actual contact with the wear strip material. However, additional suitable transport means for allowing the conveyor to travel through the guide means, such as free bearing transfer, are shown. Free bearing plate member 81 is similar to plate member 11 discussed hereinabove in reference to FIGS. 4 and 5. However, plate member 81 includes bearings 82 enclosed in housings 83. Housings 83 include mounting shanks 84 pressed into cylindrical bores 85 and are counter set into plate 81. It has been found desirable to use ball transfer bearings, well known to those skilled in the art, such as those manufactured by Iguchi Kiko Manufacturing Company, Ltd., of Tokyo, Japan.

Refer now also to FIG. 11. Suitable guide means, such as channel 90, and suitable guide support means, such as roof member 96, are shown in FIG. 11 for use with free bearing carriers 81. Elongated strip track 91 is fabricated out of a suitable material, such as spring steel, to allow rolling engagement with bearings 82. Spacers 92 are used to allow proper clearance so that carriers 81 may pass unimpeded through channel 90. Suitable mechanical bonding or coupling means, such as pins 93, are employed to couple elongated roof member 96 to strip track 91. Those skilled in the art will recognize that this embodiment does not suffer from the irregular expansion and contraction of the wear strip members 13 and 14 shown in FIGS. 1, 2 and 3 to the extent previously discussed. However, this embodiment may be altered to include the extruded coupling means of FIGS. 9 and 10 within the spirit and scope of the present invention.

Refer now to FIG. 12. It is advantageous in certain processing applications, such as bottle washing and rinsing, to invert the endless conveyor chain at certain portions along its length. In order to allow carrier plate members 11 to rotate 180° about the conveyor axis it is necessary to provide a suitable linking means, such as dumbbell links 102, to link carriers 101 to form an endless conveyor chain capable of universal rotation. Dumbbell links 102 are comprised of cylindrical shaft 103 and integral spherical ends 104 and 105. Links 102 are received within suitable universal joining means for joining links 102 to carriers 101 which allow universal or three dimensional rotation of links 102 with respect to carriers 101, such as cap members 106 and 107 and spherical reception areas 108 and 109 of carriers 101. Cap members 106 and 107 include partial spherical pockets 110 and 111 to form a complete a spherical pocket sized slightly larger than spherical ends 104 and 105 to hold spherical ends 104 and 105 captive when caps 106 and 107 are mechanically bonded to carriers 101 by suitable means, such as bolt fasteners 112. As shown in ghost, the universal joining means joins dumbbell links 102 to carriers 101 and allows carrier plate rotation about the conveyor axis. The universal joining means allows a greater range of rotational movement over that offered by the embodiment shown in FIGS. 1, 2 and 3. Those skilled in the art will recognize that carriers 101 and links 102 are designed to be used in place of carriers 11 and roller links sections 12 or rigid links 50. Accordingly, the other aspects of the present invention as described hereinabove are applicable to the alternate embodiment shown in FIG. 12.

Refer now also to FIG. 13. As discussed hereinabove, it is often desirable to invert the conveyor chain and the containers 10 being conveyed. Accordingly, it is desirable to incorporate suitable means for supporting inverted containers 10 by the annular neck projection in carriers 11, 40, 81 or 101 when the carriers are inverted. Particularly, it is desirable to hold bottles 10 in carriers 101 during an inverted rinsing process. Plates 101 include channel 120 designed to receive flange 18 of containers 10 so that containers 10 may hang, suspended by flange 18, in the manner described hereinabove, at lip 121 of channel 120 during upright operation. Similarly, channel 120 is provided so that containers 10 may rest suspended in slots 30 by flange 18 at lip 122 of channel 120 during inverted operation. Those skilled in the art will recognize that the holding means described herein may also be incorporated into the other embodiments of the carrier plates described hereinabove. Further, those skilled in the art will recognize that other suitable holding means, such as spring clips or the like, may be used within the spirit and scope of the present invention.

Refer now to FIG. 14. The conveyance apparatus for driving associated container processing machinery of the present invention is schematically shown including suitable conveyor means for transporting containers at predetermined intervals, such as endless conveyor 130, suitable drive means 135 for providing mechanical energy to the conveyor means and associated container processing machinery including carousel type container processing machine 150. Endless conveyor 130 may be constructed according to any of the embodiments of the present invention as described hereinabove with reference to FIGS. 1 through 14. Those skilled in the art will recognize that guide means suitable to define the path 19 of conveyor 130, such as wear strip members 13 and 14 described hereinabove with reference to FIGS. 1, 2 and 3, should be employed to engage plates 11 of carrier 130 in a manner consistent with that as described above in reference to FIGS. 1, 2 and 3.

Refer now also to FIG. 15. Drive means 135 is shown comprising a suitable engine, such as electric motor 139, coupled to a suitable drive shaft member, such as drive shaft 137. Shaft 137 extends through drive stand 138 and further extends thereabove where it is mechanically coupled to suitable sprocket means, such as sprocket 160 which is adapted to engage conveyor 130. Accordingly, those skilled in the art will recognize that motor 139 powers sprocket 160 which in turn provides mechanical energy to processing machine 150 for consumption. A detailed explanation of drive means 135 is not necessary in order to understand the present invention and enable one of ordinary skill in the art to make and use the same.

Refer now again to FIG. 14. Containers 10 are inserted into slots 30 from the outside of the conveyance loop by suitable container insertion means, such as feed-screw container inserter 140. A detailed explanation of container inserter 140 is not necessary in order to understand the present invention and enable one of ordinary skilled in the art to make and use the same. Endless conveyor 130 travels in the direction indicated driven by powered sprocket 160. Conveyor 130 completes an inside turn around suitable slack reduction means, such as take-up unit 132 having suitable sprocket means for engaging conveyor 130, such as sprocket 133, completes an outside turn around suitable directional means for defining curvilinear portions in the path of travel of conveyor chain 130, such as rotatable idler mechanism 131 having suitable sprocket means adapted to engage endless conveyor 130, such as sprocket member 211, completes an inside turn around carousel type container processing machine 150 having suitable sprocket means for engaging conveyor 130, such as sprocket 151 constructed in the same manner as sprocket 160 discussed hereinabove, completes an outside turn around pulse sensor 136 and returns to drive means 135.

Refer now to FIG. 16. Those skilled in the art will recognize that the tension of endless conveyor chain 130 will vary along its length. Particularly, the tension on conveyor 130 immediately preceding sprocket 160 is often significantly greater than the tension of conveyor 130 immediately exiting sprocket 160. An undesirable amount of slack may result. Therefore, suitable tension means, such as take-up unit 132, is provided for maintaining tension on said endless conveyor chain 130. Take-up unit 132 includes sprocket 133 adapted to engage conveyor 130. By way of example (but not of limitation), sprocket 133 comprises pockets 180 incorporated into a sprocket having teeth 134 adapted to engage the 3-pin rigid link members 50 shown in FIGS. 7 and 8. It is important to note that the configuration of sprocket 133 is dependant upon the particular embodiments of plate members and linking means of conveyor 130. Those skilled in the art will recognize that the configuration of sprocket 133 will vary to adapt to the particular plate members and linking means of endless conveyor 130 within the spirit and scope of the present invention.

Sprocket 133 is mounted at the top of the take-up unit 132 and is allowed to rotate freely as required by endless conveyor 130. Sprocket 133 is mounted by suitable mechanical means, such as bolts 181, to hub 182. Hub 182 is allowed to freely rotate about bearings (not shown) seated on floating housing 184. Floating housing 184 slides on a common frame 185. Frame 185 is formed by clamping linear shafts 186 and 187 between plates 188 and 189 to form a yoke. Shafts 186 and 187 allow housing 184 to move linearly in line with drive means 135 as the endless conveyor 130 wraps about sprocket 133. Shafts 186 and 187 are surrounded by compression springs 190 and 191, respectively. Compression springs 190 and 191 urge floating housing 184 in the direction indicated to bias sprocket 133 against endless conveyor chain 130 to maintain the appropriate tension on endless conveyor chain 130 thus eliminating the possibility of the chain derailing or jamming associated equipment. Shaft 192 is provided to move the entire common frame 185 with respect to sprocket 133, thus increasing or decreasing spring pressure against the endless conveyor chain 130.

Refer now also to FIG. 17. Sprocket 160 is shown. As discussed hereinabove, sprocket 160 is adapted to engage conveyor 130. More specifically, sprocket 160 is constructed in the same manner as sprocket 133 discussed hereinabove to engage conveyor 130 when conveyor 130 is comprised of 3-pin rigid links 50 described in reference to FIG. 7 (conveyor 130 comprised of 3-pin rigid links 50 is hereinafter referred to as "conveyor 129"). It is important to note that each piece of equipment which requires a sprocket to receive conveyor 130 must be configured to accommodate the particular type of conveyor 130 employed. Therefore, each sprocket depicted in FIG. 14 is of similar construction to sprockets 133 and 160 to accommodate conveyor 129. However, the alternate and variant embodiments of the conveyor as described hereinabove may also be utilized in conjunction with appropriately matched sprockets. Further, those skilled in the art will recognize that suitable guide means are required at each sprocket illustrated in FIG. 14 to engage and define the path of travel of conveyor 130 around each said sprocket (not shown). A detailed explanation of the guide means suitable to define the path of travel around sprockets 133 and 160 is not necessary in order to understand the present invention and enable on of ordinary skill in the art to make and use the same. The guide means for defining the path of travel around sprockets 133 and 160 will vary depending upon the type of conveyor 130 employed, but in all cases is preferably constructed in a manner similar to the guide means for defining the path of travel around idler mechanism 131, processing machine 150 and pulse sensor 136 which is described hereinbelow with reference to FIG. 19 for use with conveyor 130 including carriers 11 and 3-pin rigid links 50.

Refer now to FIG. 18. Idler mechanism 131, carousel container processing machine 150 and pulse sensor 136 are shown, by way of example (but not of limitation), adapted for use with endless conveyor 129 constructed in accordance with the embodiment depicted in FIGS. 1, 2 and 3 discussed hereinabove. Endless conveyor 129 is driven by drive means 135 that forces conveyor 129 through a process loop on path 19 illustrated in FIG. 14. The process loop path 19 is partially determined by suitable guide means as described in reference to FIGS. 1, 2 and 3. Wear strip tracks 13 and 14 are shown exposing slots 20 and 21 and are primarily used for guiding conveyor 129 along rectilinear portions of the process loop. The process loop path is additionally determined by additional suitable guide means for defining the path 19 of conveyor 129 as it wraps around idler mechanism 131, container processing machine 150 and pulse sensor 136. Suitable additional guide means include a plurality of sectional wear strip members 200. Wear strip members 200 include lower portions 201 for supporting one edge of carriers 11 as endless conveyor 129 wraps through the process loop negotiating inside and outside turns, guide portions 202, and upper portions 203. Lower portions 201 and guide portions 202 are preferably integral with each other and are preferably fabricated out of alloyed polyethylene as described hereinabove. Upper portions 203 are preferably integral with or may be bonded to portions 201 and 202 to form wear strip channels 204, 205, and 206. Those skilled in the art will recognize that wear strip channels 204, 205 and 206 are similar to wear strip channels 20 and 21.

Idler mechanism 131 includes suitable guide means to cooperate with sectional wear strip members 200 for defining the path of travel of endless conveyor 129. Specifically, sprocket 211 having teeth 212 adapted to engage endless conveyor 129 below the plane formed by plate members 11 so that one edge of plate members 11 may rest in pockets 213 defined by guide portion 214, is mounted to free spinning hub 210 to allow rotational movement with endless conveyor chain 129. Guide portion 214 is bonded to the surface of sprocket 211 to rotate therewith to ensure that a path of travel around sprocket 131 is defined. Additionally, pockets 213 provide a support function similar to that of lower portions 201 of sectional wear strip members 200. Guide disk 215 rotates with sprocket 211 to form a function equivalent to upper wear strip member 203.

Container processing machine 150 includes sprocket 151 (not shown in FIG. 18) having a configuration similar to sprocket 211. Similarly, pulse sensor 136 is configured similar to idler mechanism 131 including sprocket 211 having teeth 212 adapted to engage endless conveyor 129 below the plane formed by plate members 11 so that one edge of plate members 11 may rest in pockets 213 defined by guide portion 214 (not shown). Pulse sensor 136 is similar to idler mechanism 131, but may further contain sensing elements (not shown). An explanation of pulse sensor 136, however, is not necessary in order to understand the present invention and enable one of ordinary skill in the art to make and use the same.

Refer now again to FIG. 14 and now also to FIG. 19. As discussed in reference to FIG. 14, endless conveyor chain 130 may be constructed in accordance with any of the embodiments of the present invention discussed hereinabove. Therefore, by way of example (but not of limitation), FIG. 19 shows suitable sprocket means for engaging conveyor 128, such as sprocket member 170. Sprocket member 170 is adapted to receive and engage endless conveyor chain 128 which is constructed in accordance with the embodiment shown and described hereinabove in reference to FIG. 12. Sprocket member 170 includes guide disk 171 integral with upper and lower sprocket disks 174 and 175 defining pockets 173.

The above-described apparatus for conveying containers functions as follows:

Feedscrew container inserter 140 inserts containers 10 into slots 30 of a suitable conveyor chain 130 as described hereinabove. The nature of the conveyor chain 130 is such that the containers 10 are spaced uniformly so that the containers will be conveyed at predetermined intervals to associated container processing machines 150 being supported by annular neck flange 18 throughout processing. Conveyor 130 carries suspended containers 10 through associated processing machinery 150 built for or adapted to the system. Conveyor 130 wraps around and engages the receptive sprockets of idler mechanism 131, associated processing machinery 150, and pulse sensor 136.

Motor 139 powers sprocket 160 which is adapted to engage conveyor 130. Because conveyor 130 forms a continuous mechanical assembly, or chain, and wraps around the receptive sprockets of the associated processing machinery 150, it therefore offers the added advantage of providing the mechanical energy supplied by motor 139 to the associated processing machinery 150 thereby eliminating the need to supply and time multiple driving systems. Take-up unit 132 is able to maintain constant tension on conveyor 130 to eliminate slack and to relieve excess tension on conveyor 130 during start-up.

A typical conveyance loop comprises any number of container processing machines 150 from one machine 150 to as many as 5 or more machines. Container processing machine 150 may comprise container washing apparatus, container rinsing apparatus, container filling apparatus, apparatus for affixing labels to the containers, apparatus for closing the containers, or other apparatus well known to those skilled in the art. Regardless of the exact function and physical configuration of container processing machine 150, machine 150 must have sprocket means to engage endless conveyor 130 as discussed hereinabove so that the energy supplied by drive means 135 is available for consumption by machine 150 in order to eliminate additional machine 150 powered drive means. Accordingly, an explanation of container processing machine 150 is not necessary in order to understand the present invention and enable one of ordinary skill in the art to make and use the same.

Additionally, because conveyor 130 is capable of curvilinear travel, a plurality of container processing machinery 150 may be incorporated into the processing loop in close proximity to one another thereby eliminating the need for the large amount of floor space which is needed for conventional line systems. Conveyor 130 is able to wrap around each piece of associated processing machinery 150 to carry a wide variety of suspended containers by their annular neck flange without the need to transfer the containers from the conveyor 130 and without the need for processing line changeover to accommodate containers of varying height. Further, because each piece of associated machinery 150 is able to derive its operating power from conveyor 130, the need to employ starwheels or feedscrews to ensure that the containers are fed to associated machinery at the proper rate is eliminated.

The foregoing relates to preferred exemplary embodiments of the invention, it being understood that other variants and embodiments thereof are possible within the spirit and scope of the invention, the latter being defined by the appended claims.

What is claimed is:

1. A conveyance apparatus for transporting containers, the containers having an annular neck projection formed thereon, comprising:
   means for suspending the containers by their respective annular neck projections comprising a plurality of support elements;
   linking means for flexibly linking said support elements to form an endless conveyor chain; and
   guide means engaging said support elements and defining a path of travel for said endless conveyor chain; said support elements each defining a "U" shaped recess having a pair of substantially parallel sides oriented transverse to the path of travel of said endless conveyor chain so that said "U" shaped recess is accessible from the side of said path of travel, said "U" shaped recess being sized to receive the container neck and being sized smaller than the annular neck projection of the container, said "U" shaped recess further being sized so that said substantially parallel sides of said "U" shaped recess extend beyond the container neck of any container received therein to suspend the container in said "U" shaped recess.

2. The apparatus of claim 1 further including means for transporting said support elements along said path of travel.

3. The apparatus of claim 2 wherein said means for transporting said support elements comprises bearing means for rolling engagement with said guide means.

4. The apparatus of claim 1 wherein said support elements further include means for supporting inverted containers by the annular neck projection.

5. The apparatus of claim 1 wherein said support elements each comprise an outer plate member having a generally "C" shaped recess, said "C" shaped recess having a groove formed therein, and an interchangeable inner plate member configured to be received within said groove and having said "U" shaped recess being defined thereon.

6. The apparatus of claim 1 wherein said linking means comprises flexible tension members.

7. The apparatus of claim 6 wherein said flexible tension members comprise a plurality of roller chain links.

8. The apparatus of claim 1 wherein said linking means comprises a plurality of rigid chain links, each said rigid chain link being adapted to rotatably link two of said support elements.

9. The apparatus of claim 8 wherein said rigid chain links comprise at least two bushing cylinders.

10. The apparatus of claim 8 wherein said rigid chain links comprise three bushing cylinders.

11. The apparatus of claim 1 wherein said linking means comprises a plurality of dumbbell links, each said dumbbell link comprising first and second spheres connected by a cylindrical shaft member.

12. The apparatus of claim 11 further including universal joining means for joining said dumbbell links to said support elements, said universal joining means adapted to receive at least one of said first and second spheres and further adapted to allow three dimensional rotation of said dumbbell links with respect to said support elements.

13. The apparatus of claim 1 further comprising directional means for defining curvilinear portions in said path of travel.

14. The apparatus of claim 13 wherein said directional means comprises idler sprocket apparatus adapted to engage said conveyor chain.

15. The apparatus of claim 1 further including support means for supporting said guide means.

16. The apparatus of claim 15 wherein said support means includes means for coupling said guide means to said support means.

17. The apparatus of claim 16 wherein said means for coupling said guide means to said support means is configured to allow relative sliding movement between said support means and said guide means to allow for thermal expansion and contraction of said guide means.

18. The apparatus of claim 15 wherein said support means comprises an elongated roof member configured to allow passage of the containers thereunder.

19. A conveyance apparatus for transporting containers, the containers having an annular neck projection formed thereon, comprising:
  a plurality of support elements;
  linking means for flexibly linking said support elements to form an endless conveyor chain; and
  guide means engaging said support elements and defining a path of travel for said endless conveyor chain; said support elements each defining a "U" shaped recess having a pair of substantially parallel sides oriented transverse to the path of travel of said endless conveyor chain so that said "U" shaped recess is accessible from the side of said path of travel, said "U" shaped recess being sized to receive the container neck and being sized smaller than the annular neck projection of the container, said "U" shaped recess further being sized so that said substantially parallel sides of said "U" shaped recess extend beyond the container neck of any container received therein so that said container may hang suspended in said "U" shaped recess; said guide means comprising first and second opposing spaced elongated wear strip members, said first wear strip member having a first channel adapted to receive a first portion of said support elements, and said second wear strip member having a second channel adapted to receive a second portion of said support elements, so that said endless conveyor chain may slide suspended between said first and second wear strip members.

20. The apparatus of claim 19 wherein said first and second wear strip members are fabricated from self-lubricating plastic.

21. Conveyance apparatus for transporting containers and driving associated container processing machinery, the containers having an annular neck projection formed thereon, comprising:
  conveyor means for transporting the containers at predetermined intervals, said conveyor means comprising means for suspending the containers by their respective annular neck projections;
  drive means for providing mechanical energy to said conveyor means; and
  at least one associated container processing machine having a predetermined application, said associated container processing machine having sprocket means for engaging said conveyor means so that said conveyor means delivers the containers to said associated container processing machine, and means for translating said mechanical energy into operating power for said associated container processing machine.

22. The apparatus of claim 21 wherein said drive means comprises an engine coupled to a drive shaft member.

23. The apparatus of claim 22 wherein said drive means further includes sprocket means mechanically coupled to said drive shaft for engaging said conveyor means.

24. The apparatus of claim 21 wherein said conveyor means comprises an endless conveyor chain.

25. The apparatus of claim 24 further including tension means for maintaining tension on said endless conveyor chain.

26. The apparatus of claim 25 wherein said tension means comprises biased sprocket apparatus adapted to engage said endless conveyor positioned to urge said endless conveyor in a manner to increase tension thereon.

27. The apparatus of claim 24 wherein said means for suspending comprises a plurality of support elements for carrying containers having an annular neck projection formed thereon along a predetermined path of travel, said support elements each defining a "U" shaped recess having a pair of substantially parallel sides oriented transverse to the path of travel of said endless conveyor chain so that said recess is accessible from the side of said path of travel, said "U" shaped recess being sized to receive the container neck and being sized smaller than the annular neck projection of the container, said "U" shaped recess further being sized so that said substantially parallel sides of said "U" shaped recess extend beyond the container neck of any container received therein to suspend the container in said "U" shaped recess.

28. The apparatus of claim 27 wherein said support elements each comprise an outer plate member having a generally "C" shaped recess, said "C" shaped recess having a groove formed therein, and an interchangeable inner plate member configured to be received within said groove and having said "U" shaped recess being defined thereon.

29. The apparatus of claim 27 wherein said support elements further include means for supporting inverted containers by the annular neck projection.

30. The apparatus of claim 27 further comprising lining means for flexibly linking said support elements to form said endless conveyor chain.

31. The apparatus of claim 30 wherein said linking means comprises flexible tension members.

32. The apparatus of claim 31 wherein said flexible tension members comprise a plurality of roller chain links.

33. The apparatus of claim 30 wherein said linking means comprises a plurality of rigid chain links, each said rigid chain link being adapted to link two of said support elements.

34. The apparatus of claim 33 wherein said rigid chain links comprise at least two bushing cylinders.

35. The apparatus of claim 33 wherein said rigid chain links comprise three bushing cylinders.

36. The apparatus of claim 30 wherein said linking means comprises a plurality of dumbbell links, each said dumbbell link comprising first and second spheres connected by a cylindrical shaft member.

37. The apparatus of claim 36 further including universal joining means for joining said dumbbell links to said support elements, said universal joining means adapted to receive at least one of said first and second spheres and further adapted to allow three dimensional rotation of said dumbbell links with respect to said support elements.

38. The apparatus of claim 27 further comprising guide means engaging said support elements for defining said path of travel.

39. The apparatus of claim 38 further including means for transporting said support elements along said path of travel.

40. The apparatus of claim 39 wherein said means for transporting said support elements comprises at least one elongated self-lubricating plastic member in sliding engagement with said support elements.

41. The apparatus of claim 39 wherein said means for transporting said support elements comprises bearing means for rolling engagement with said guide means.

42. The apparatus of claim 38 further comprising directional means for defining curvilinear portions in said path of travel.

43. The apparatus of claim 42 wherein said directional means comprises idler sprocket apparatus adapted to engage said conveyor chain.

44. The apparatus of claim 38 wherein said guide means comprises first and second opposing spaced elongated wear strip members, said first wear strip member having a first channel adapted to receive a first portion of said support elements, and said second wear strip member having a second channel adapted to receive a second portion of said support elements, so that said endless conveyor chain may slide suspended between said first and second wear strip members.

45. The apparatus of claim 44 wherein said first and second wear strip members are fabricated from self-lubricating plastic.

46. The apparatus of claim 44 further including support means for supporting said guide means.

47. The apparatus of claim 46 wherein said support means includes means for coupling said guide means to said support means.

48. The apparatus of claim 47 wherein said means for coupling said guide means to said support means is configured to allow relative sliding movement between said support means and said guide means to allow for thermal expansion and contraction of said guide means.

49. The apparatus of claim 46 wherein said support means comprises an elongated roof member configured to allow passage of the neck suspended containers thereunder.

50. The apparatus of claim 21 further comprising container insertion means for inserting containers into said conveyor means.

51. Container conveyance apparatus for conveying containers, the containers having an annular neck projection formed thereon, comprising:
an endless link type conveyor;
means for suspending the containers by their respective annular neck projections comprising continuous support elements for supporting the containers;
powered sprocket means mechanically coupled to said endless link type conveyor for driving said endless link type conveyor; and
at least one associated container processing machine having a predetermined application which derives operating power from said endless link type conveyor.

52. The apparatus of claim 51 wherein said powered sprocket means comprises a sprocket adapted to engage said endless link type conveyor coupled to a drive shaft member, wherein said drive shaft member is coupled to an engine.

53. The apparatus of claim 51 further including tension means for maintaining tension on said endless link type conveyor.

54. The apparatus of claim 53 wherein said tension means comprises biased sprocket apparatus adapted to engage said endless link type conveyor positioned to urge said endless link type conveyor in a manner to increase tension thereon.

55. The apparatus of claim 51 wherein said endless link type conveyor comprises linking means for flexibly linking said support elements to form said endless link type conveyor.

56. The apparatus of claim 55 wherein said linking means comprises flexible tension members.

57. The apparatus of claim 56 wherein said flexible tension members each comprise a plurality of roller chain links.

58. The apparatus of claim 55 wherein said linking means comprises a plurality of rigid chain links, each said rigid chain link being adapted to link two of said support elements.

59. The apparatus of claim 58 wherein said rigid chain links comprise at least two bushing cylinders.

60. The apparatus of claim 58 wherein said rigid chain links comprise three bushing cylinders.

61. The apparatus of claim 55 wherein said linking means comprises a plurality of dumbbell links, each said dumbbell link comprising first and second spheres connected by a cylindrical shaft member.

62. The apparatus of claim 61 further including universal joining means for joining said dumbbell links to said support elements, said universal joining means adapted to receive at least one of said first and second spheres and further adapted to allow three dimensional rotation of said dumbbell links with respect to said support elements.

63. The apparatus of claim 55 further comprising guide means engaging said continuous support elements for defining a path of travel for said endless link type conveyor.

64. The apparatus of claim 63 further including means for transporting said continuous support elements along said path of travel.

65. The apparatus of claim 64 wherein said means for transporting said support elements comprises at least one elongated self-lubricating plastic member in sliding engagement with said support elements.

66. The apparatus of claim 64 wherein said means for transporting said support elements comprises bearing means for rolling engagement with said guide means.

67. The apparatus of claim 55 further comprising directional means for defining curvilinear portions in said path of travel.

68. The apparatus of claim 67 wherein said directional means comprises idler sprocket apparatus adapted to engage said endless link type conveyor.

69. The apparatus of claim 63 wherein said guide means comprises first and second opposing spaced elongated wear strip members, said first wear strip member having a first channel adapted to receive a first portion of said continuous support elements, and said second wear strip member having a second channel adapted to receive a second portion of said continuous support elements, so that said endless link type conveyor may slide suspended between said first and second wear strip members.

70. The apparatus of claim 69 wherein said first and second wear strip members are fabricated from self-lubricating plastic.

71. The apparatus of claim 65 further including support means for supporting said guide means.

72. The apparatus of claim 71 wherein said support means includes means for coupling said guide means to said support means.

73. The apparatus of claim 72 wherein said means for coupling said guide means to said support means is configured to allow relative sliding movement between said support means and said guide means to allow for thermal expansion and contraction of said guide means.

74. The apparatus of claim 71 wherein said support means comprises an elongated roof member configured to allow passage of the neck suspended containers thereunder.

75. The apparatus of claim 63 wherein each of said continuous support elements defines a "U" shaped recess for receiving a container having an annular neck projection, said "U" shaped recess having a pair of substantially parallel sides oriented transverse to said path of travel of said endless link type conveyor so that said recess is accessible from the side of said path of travel, said "U" shaped recess being sized to receive the container neck and being sized smaller than the annular neck projection of the container, said "U" shaped recess further being sized so that said substantially parallel sides of said "U" shaped recess extend beyond the container neck of any container received therein so that said container may hang suspended in said "U" shaped recess.

76. The apparatus of claim 75 wherein said support elements each comprise an outer plate member having a generally "C" shaped recess, said "C" shaped recess having a groove formed therein, and an interchangeable inner plate member configured to be received within said groove and having said "U" shaped recess being defined thereon.

77. The apparatus of claim 75 wherein said support elements further include means for supporting inverted containers by the annular neck projection.

78. The apparatus of claim 51 further comprising container insertion means for inserting containers into said conveyor means.

79. A conveyance apparatus for transporting containers, the containers having an annular neck projection formed thereon, comprising:
   a plurality of support elements;
   linking means for flexibly linking said support elements to form an endless conveyor chain;
   guide means engaging said support elements and defining a path of travel for said endless conveyor chain; said support elements each defining a "U" shaped recess having a pair of substantially parallel sides oriented transverse to the path of travel of said endless conveyor chain so that said "U" shaped recess is accessible from the side of said path of travel, said "U" shaped recess being sized to receive the container neck and being sized smaller than the annular neck projection of the container, said "U" shaped recess further being sized so that said substantially parallel sides of said "U" shaped recess extend beyond the container neck of any container received therein so that said container may hang suspended in said "U" shaped recess; and
   means for transporting said support elements along said path of travel comprising at least one elongated self-lubricating plastic member in sliding engagement with said support elements.

* * * * *

UNITED STATES PATENT AND TRADEMARK OFFICE
CERTIFICATE OF CORRECTION

PATENT NO. : 5,353,908
DATED : October 11, 1994
INVENTOR(S) : Wihlidal, Daryl E., It is certified that error appears in the above-indentified patent and that said Letters Patent is hereby corrected as shown below:

Column 8, line 4, after "rivet" insert --,--.

Column 16, line 36, delete "lining" and insert therefor --linking--.

Column 20, line 1, delete "75" and insert therefor --72--.

Signed and Sealed this

Twenty-seventh Day of August, 1996

Attest:

BRUCE LEHMAN

*Attesting Officer*    *Commissioner of Patents and Trademarks*